US006918007B2

(12) United States Patent
Chang et al.

(10) Patent No.: US 6,918,007 B2
(45) Date of Patent: Jul. 12, 2005

(54) MEMORY CONTROLLER INTERFACE WITH XOR OPERATIONS ON MEMORY READ TO ACCELERATE RAID OPERATIONS

(75) Inventors: Albert H. Chang, Houston, TX (US); Jeff M. Carlson, Cypress, TX (US); Christopher Garza, Houston, TX (US); Mark J. Thompson, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 10/237,330

(22) Filed: Sep. 9, 2002

(65) Prior Publication Data

US 2004/0049632 A1 Mar. 11, 2004

(51) Int. Cl.[7] .............................................. G06F 12/00
(52) U.S. Cl. ...................................................... 711/114
(58) Field of Search ................................. 711/112, 114, 711/165; 708/232; 714/6, 8; 713/6, 8

(56) References Cited

U.S. PATENT DOCUMENTS

| | | | |
|---|---|---|---|
| 5,101,492 A | 3/1992 | Schultz et al. | |
| 5,166,936 A | 11/1992 | Ewert et al. | |
| 5,206,943 A | * 4/1993 | Callison et al. ............. | 711/114 |
| 5,249,279 A | 9/1993 | Schmenk et al. | |
| 5,440,716 A | 8/1995 | Schultz et al. | |
| 5,448,719 A | 9/1995 | Schultz et al. | |
| 5,450,609 A | 9/1995 | Schultz et al. | |
| 5,623,625 A | 4/1997 | Thompson et al. | |
| 5,809,224 A | 9/1998 | Schultz et al. | |
| 5,809,560 A | 9/1998 | Schneider | |
| 5,822,584 A | 10/1998 | Thompson et al. | |
| 5,829,019 A | 10/1998 | Thompson et al. | |
| 5,961,652 A | 10/1999 | Thompson | |
| 6,058,489 A | 5/2000 | Schultz et al. | |
| 6,092,169 A | 7/2000 | Murthy et al. | |
| 6,161,165 A | * 12/2000 | Solomon et al. ............. | 711/114 |
| 6,341,342 B1 | 1/2002 | Thompson et al. | |
| 6,370,616 B1 | * 4/2002 | Callison et al. ............. | 711/114 |

OTHER PUBLICATIONS

High Speed Hardware Exclusive Or Engine for Redundant Array of Inexpensive Drives Applications, IBM Technical Disclosure Bulletin, Jan. 1995, vol. No. 38, Issue No. 1, pp. 3–8.*

Patterson, David A., Gibson, Garth, and Katz, Randy H., A Case for Redundant Arrays of Inexpensive Disks (RAID), Computer Science Division, Department of Electrical Engineering and Computer Sciences, University of Berkeley, 1988, pp. 109–116.

Alvarez, Guillermo, Burkhard, Walter A., and Cristian, Flaviu, Tolerating Multiple Failures in RAID Architectures with Optimal Storage and Uniform Declustering, Department of Computer Science and Engineering, University of California, San Diego, Nov. 1996, pp. 1–11.

* cited by examiner

Primary Examiner—Pierre M. Vital

(57) ABSTRACT

A single read request to a memory controller generates multiple read actions along with XOR/DATUM manipulation of that read data. Fewer memory transfers are required to accomplish a RAID5/DATUM parity update. This allows for higher system performance when memory bandwidth is the limiting system component. In implementation, a read buffer with XOR capability is tightly coupled to a memory controller. New parity does not need to be stored in the controller's memory. Instead, a memory read initiates multiple reads from memory based on an address decode. The data from the reads are multiplied and XOR'd before being returned to the requestor. In the case of a PCI-X requestor, this occurs as a split-completion.

31 Claims, 8 Drawing Sheets

Figure 1. Prior Art "Write XOR"

Figure 2. Read XOR with DATUM Multiplication

Figure 3. RAID5 Small Write using Write XOR (Prior Art)

Figure 4. RAID5 Small Write using Read XOR

Figure 5. DATUM RAID Small Write using Write XOR

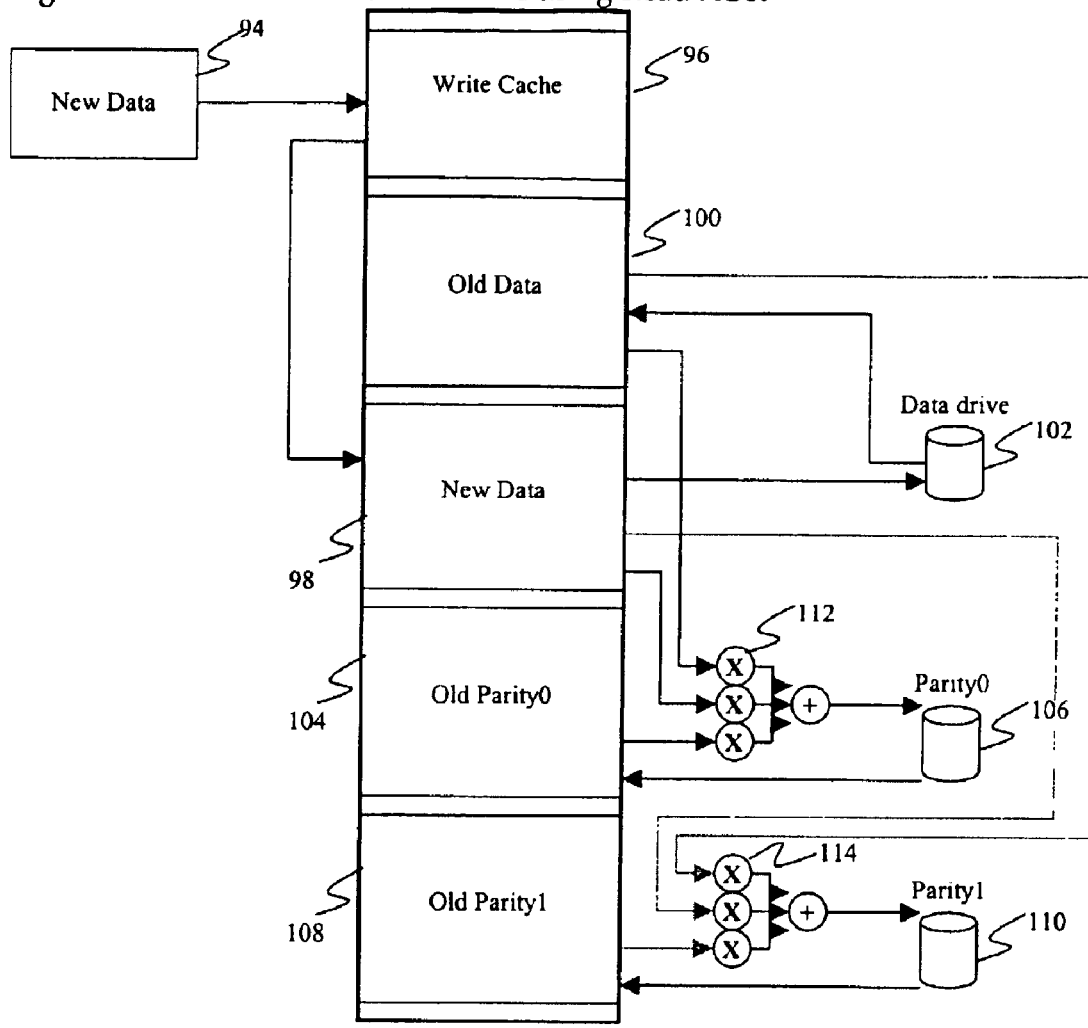
Figure 6. DATUM RAID Small Write using Read XOR

Figure 7. ASIC block diagram
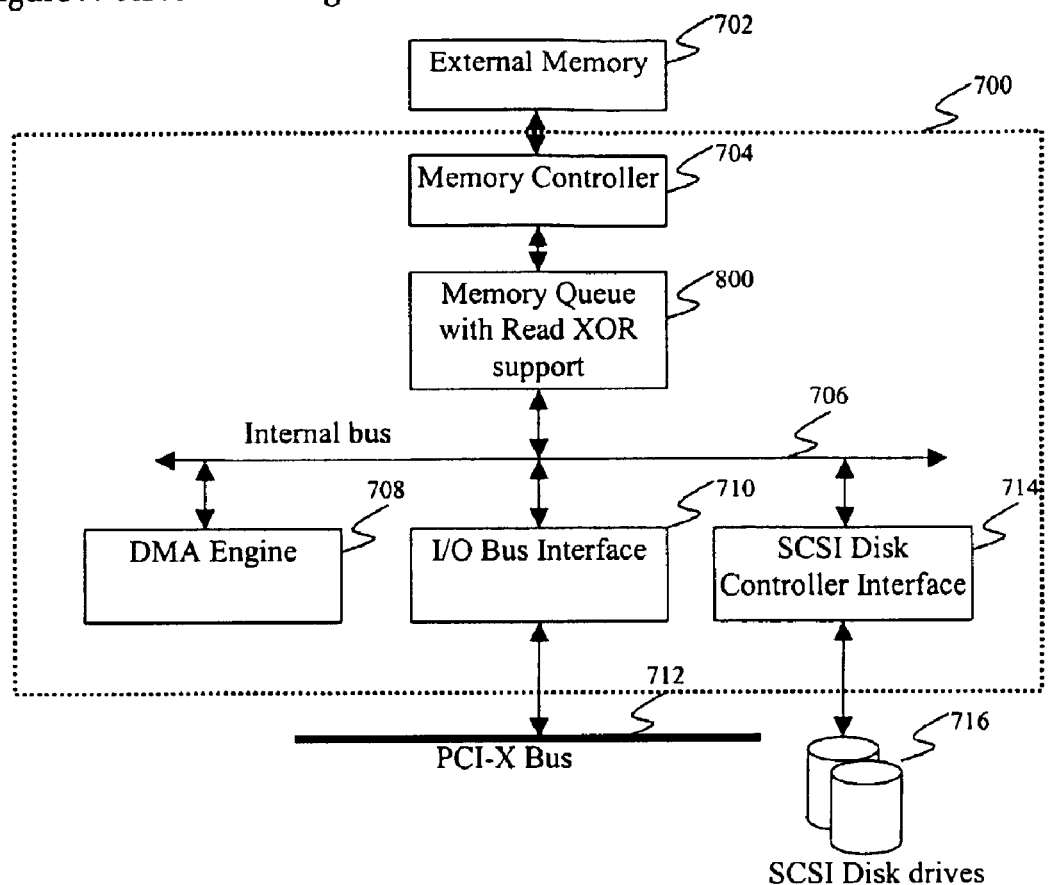

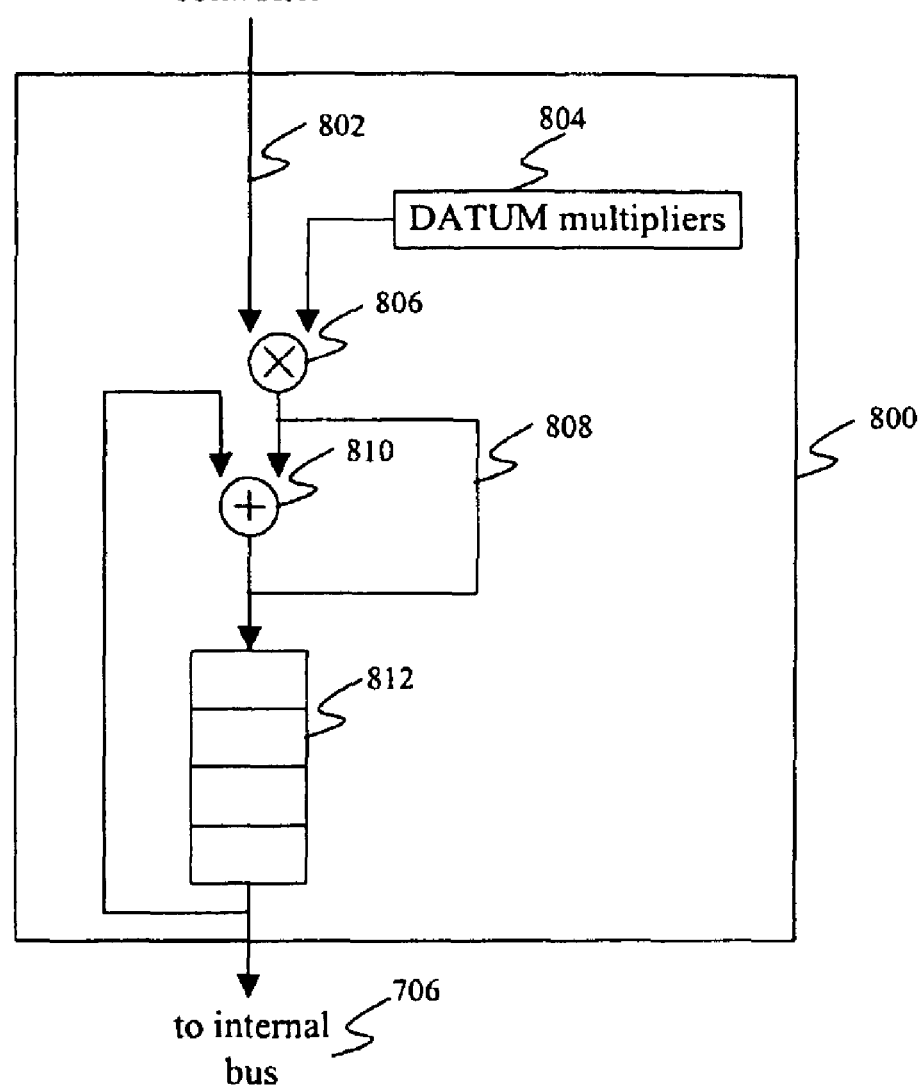
Figure 8. Read XOR Support Logic in Memory Queue

MEMORY CONTROLLER INTERFACE WITH XOR OPERATIONS ON MEMORY READ TO ACCELERATE RAID OPERATIONS

BACKGROUND OF THE INVENTION

1. Field of the Invention

The present invention generally relates to multiple data disk storage technology, and, more particularly, to a memory interface controller for DATUM RAID operations with a DATUM multiplier.

2. Description of the Related Art

Due to the increasing importance of business-critical data to many companies, fault tolerance is often a priority for network storage systems. Fault tolerance, in the context of a disk array subsystem, is the ability of a disk array to continue to perform its functions even when one or more disks have failed. Parity RAID and declustering architectures are network storage solutions commonly utilized to provide fault tolerance against a single disk failure. RAID, which stands for Redundant Array of Inexpensive Disks, relates to the concept of using multiple inexpensive disks as one unit in the place of a single large disk, for improved storage reliability and system performance. This idea, which is now the industry standard, was introduced in a December 1987 article entitled "A Case for Redundant Arrays of Inexpensive Disks (RAID)" by D. Patterson, G. Gibson, and R. H. Katz.

To date, a variety of RAID architectures (industry and proprietary) have been utilized for network storage. RAID 5, which utilizes parity information to provide redundancy and fault tolerance, is one example. RAID 5 architecture uses data striping to spread or interleave user data and redundancy information (e.g., parity) across all the disks in an array. Striping generally refers to spreading data evenly over multiple disks. In other words, a segmented data block is broken into segments of a unit length and sequential segments are written to sequential disk drives. The combination of corresponding sequential data segments across each of the disks is referred to as a stripe. In the event of a failed disk, the parity information allows for recovery or reconstruction of the data of the failed disk. Parity declustering is the uniform distribution of user data and parity data over a disk array where each stripe uses a subset of the disks.

In contrast to parity declustering and conventional RAID architectures, certain disk array architectures mask multiple simultaneous disk failures. One advantage of such architectures is handling of latent sector errors. A sector error can be discovered when an array has already suffered a failure. Another advantage of architectures capable of tolerating multiple concurrent failures is handling of communication failures since communication failures can render disks inaccessible. DATUM, which stands for Disk Arrays with optimal storage, Uniform declustering and Multiple-failure tolerance, is an example of an array architecture for masking or tolerating multiple disk failures in disk arrays. In terms of uniform declustering, the architecture basically provides an array layout of user data and redundancy data, which distributes redundancy data evenly or uniformly among disks in the array. Most declustered disk array layouts that can tolerate a single failure can be characterized by certain desirable properties. For example, to recover from a single disk crash, no two units of the same stripe are matched to the same disk. Another desirable property is distributed parity, whereby all disks have the same number of parity or check units mapped to them. A further desirable property, termed distributed reconstruction, involves providing a constant number of stripes with units mapped to both disks for every pair of disks.

In terms of optimal storage, DATUM uses a theoretical minimum amount of storage space for storing redundancy data in the array. DATUM employs an information dispersal algorithm (IDA) to uniformly distribute redundancy data on all the disks. The IDA algorithm encodes a sequence $E=(d_1, d_2, \ldots, d_m)$ of m integers into a sequence of m+f integers $(e_1, e_2, \ldots, e_m, e_{m+1}, \ldots, e_{m+f})$ in such a way that any m of the m+f integers suffice to recover a sequence F. The sequence F represents "m" equal-sized portions of user or client data, and m+f values represents encoded data including redundancy data. The transformation of user data into encoded data by the IDA algorithm can be represented in the form of a mx(m+j) matrix T (i.e., a matrix having m linear independent columns and m+f rows). Both user data and redundancy data are organized in terms of striping units. Disk space is logically structured into striping units, where each striping unit has a fixed number of sectors. A stripe consists of a fixed number of user data stripe units and a number of redundant stripe units. Different striping units of the same stripe are mapped to different disks. In other words, units of the same strip are not stored in the same disk. Any data stripe can be reconstructed if m or more disks are correct; that is, if "f" or fewer disks have failed. DATUM thus uses only the theoretical minimum amount of disk space to store each stripe so that its contents are recoverable even if stripe units are missing.

Aside from storage space, DATUM is also optimal with respect to write overhead. That is, DATUM performs the minimum number of disk accesses to implement small writes. A small write occurs when a single stripe unit is written by a client application. A small write for a parity redundancy RAID architecture has generally reduced disk array performance. To implement a small write with DATUM, it has been necessary to (i) read the old values of the data unit being written and the "f" redundant units, (ii) recompute the check stripe unit values, and (iii) write the new data stripe value as well as the "f" check stripe units. In RAID architectures, this is often called read-modify-write (read old values from disk, modify them with the new values, and write them back to the disk). Since it has not been possible to write less than f+1 stripe units if the array is to tolerate up to f failures, DATUM performs the optimal number f+1 disk writes per small write operation.

When f=1, DATUM RAID can be modeled as a RAID5 system. In the read-modify-write process for a small write: 1) the old data and old parity are read from the disk drives, 2) new parity is calculated from old data, old parity and new data, 3) new data and new parity are written back to the disk drives.

DATUM is considered the first known technique for tolerating an arbitrary number of failures that is optimal with respect to both storage space and write overhead, and that distributes redundant data uniformly by using a set of layout functions that can be evaluated efficiently with very low memory requirements. With DATUM, the size of a redundant unit is independent of the number of units per stripe. Further details regarding DATUM can be found in an article entitled "Tolerating Multiple Failures in RAID Architectures with Optimal Storage and Uniform Declustering" by Guillermo A. Alvarez, Walter A. Burkhard and Flaviu Cristian, Department of Computer Science and Engineering, University of California, San Diego, which is incorporated herein by reference.

While this present technique improves system performance and reliability, certain RAID levels involve XORing data to generate parity. Current XOR methodology requires more memory bandwidth than is available in current designs to saturate other buses in the system (e.g. PCI). It would be beneficial if the same necessary XOR function could be performed in fewer steps, thus conserving memory bandwidth.

SUMMARY OF THE INVENTION

According to the present invention, a single read request to a memory controller generates multiple read actions along with XOR/DATUM manipulation of that read data. Fewer memory transfers are required to accomplish a RAID5/DATUM parity update. This allows for higher system performance when memory bandwidth is the limiting system component. A preferred implementation has a read buffer with XOR capability and DATUM manipulation tightly coupled to a memory controller. In the present invention, new parity does not need to be stored in the controller's memory. Instead, a memory read initiates three reads from memory based on an address decode. The data from the three reads are DATUM multiplied and XOR'd before being returned to the requester. In the case of a PCI-X requester, this occurs as a split-completion. A DMA engine could also use the same memory controller technique to accelerate drive rebuilds. Fewer DMA transfers would be required compared to present methods.

It is an advantage of the present invention that it improves performance for RAIDS and DATUM redundancy data read-modify-write updates.

It is a further advantage of the "Read XOR" technique of the present invention that it reduces the number of memory operations (reduced memory bandwidth) required to generate new redundancy data.

Reduced memory bandwidth results in the following advantages of the present invention: the ability to use slower and cheaper memory designs and technologies; the ability to use narrower memory busses with higher speed technologies; and the realization of higher performance for memory bandwidth constrained systems.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 6 is a block diagram of an DATUM drive small write using "Read XOR" with write cache;

FIG. 7 is an ASIC block diagram incorporating the present invention; and

FIG. 8 is a diagram of the Read XOR Support Logic in a Memory Queue.

DETAILED DESCRIPTION

Figure 1:
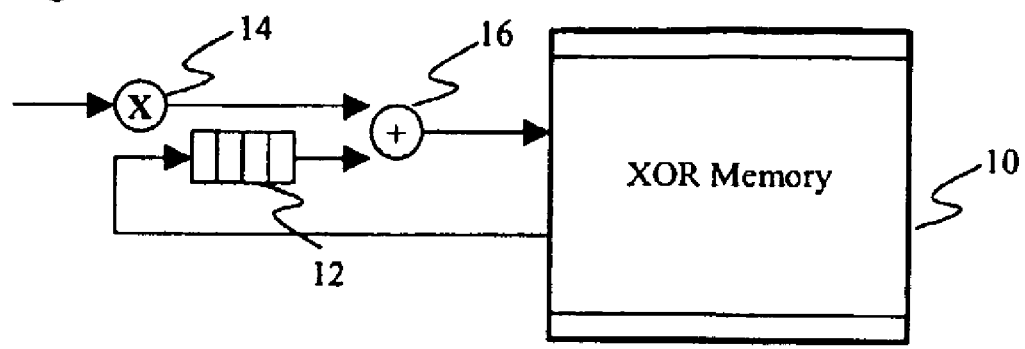
FIG. 1 is a block diagram of a prior art "Write XOR" with DATUM multiply.

Referring now to FIG. 1, the current methodology for performing a "Write XOR" with DATUM multiply is shown. Typically, data in destination memory 10 is read into a buffer 12. Source data is then DATUM multiplied 14 and XOR'd 16 with destination data. The resultant XOR'd data is written back into same memory 10.

In an array controller (such as the Compaq Smart Array), there is typically a memory subsystem. Disk controllers (such as SCSI protocol devices) master data in and out of the memory subsystem. The present XOR method as used in the Smart Array ("Write XOR") causes the memory subsystem to read from memory, XOR the incoming write data with the data it just read, and then writes the result back to the memory subsystem. This is often referred to as a "read-modify-write cycle" (not the same as RAID read-modify-write for small writes).

Note the $\otimes$ symbol used in FIG. 1 above. In these figures, "$\otimes$" refers to a DATUM multiplication operation. A DATUM multiplication with a value of 1 does not modify the inbound write data (unity operation).

For the purposes of the diagram, note that each arrow entering the memory box 10 represents a write operation and each arrow leaving the memory box represents a read operation. The diagram of FIG. 1 above thus has one read and one write operation to the memory subsystem.

Figure 2:
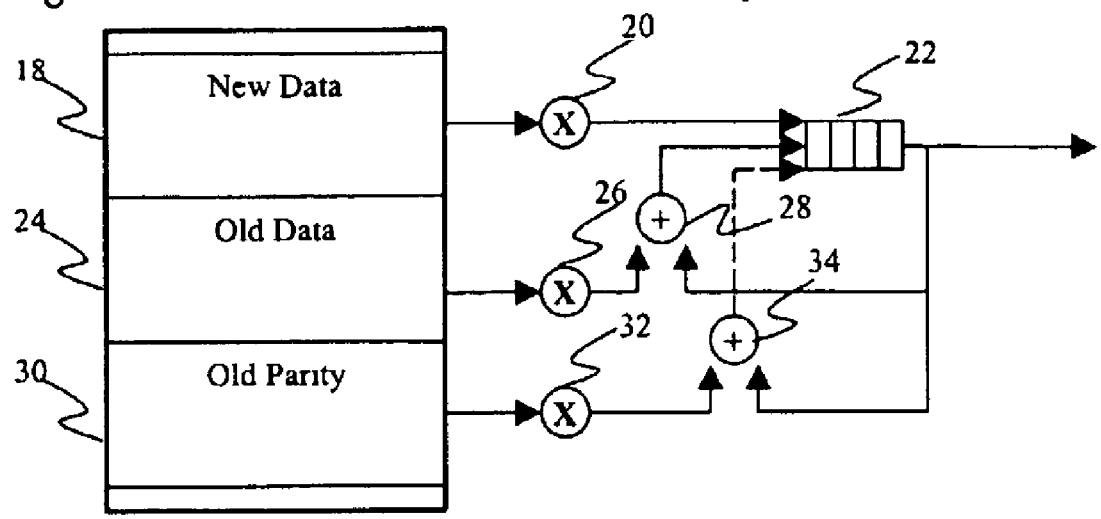
FIG. 2 is a block diagram of "Read XOR" with DATUM multiply.

Referring now to FIG. 2, a new methodology for performing an XOR on Read with DATUM multiply is shown. A first data block 18 (new data) is read from memory, DATUM multiplied 20 and stored into a buffer 22. Next, a second data block 24 (old data) is read from memory, DATUM multiplied 26 and XOR'd 28 with current buffer contents and stored back into the buffer 22. Next, a third data block 30 (old parity) is read from memory, multiplied 32 and XOR'd 34 with current buffer contents and stored back into the buffer 22. The contents of the buffer 22 (new parity) are then sent to the read requester.

The new methodology according to the present invention is referred to here as "XOR on Read" but is also referred to as "Read XOR". In this methodology, XOR operations occur on read requests to the memory subsystem. In this case, three read operations occur for the one read from memory request. In addition, three DATUM multipliers may also be specified.

TABLE 2

Summary of Number of Memory Operations

| The benefit of a Read XOR becomes apparent when the number of memory operations incurred during a typical RAID operation is analyzed. Table 2 below compares the number of memory operations required to perform a backed-out-write for each methodology. | "Write XOR" (Prior Art) | Read XOR (Present Invention) |
|---|---|---|
| RAID5: small write, one parity drive | 11 | 9 |
| DATUM: small write, two redundancy drives updated | 21 | 13 |

In a small write (or RAID read-modify-write), only one data drive has new data and is involved in updating the parity drive. So the new parity can be calculated by taking the old parity value, "backing out" the old data value (using XOR), and XOR-ing back in the new data value to result in the new parity value.

As an illustration, consider four disks, A, B, C and D and one parity disk P. D' is the new data and P' is the new parity.
Old parity: $A \oplus B \oplus C \oplus D = P$
New parity: $A \oplus B \oplus C \oplus D' = P'$
Rather than calculate P' from A, B, C and D', we can calculate P' from P, D and D':

$A \oplus B \oplus C = P \oplus D$ $A \oplus B \oplus D \oplus D' = P \oplus D \oplus D'$ but $A \oplus B \oplus C \oplus D' = P'$ so $P' = P \oplus D \oplus D \oplus D'$ For larger RAID volumes, this saves on the overall number of disk accesses (which are much slower than memory accesses).

The next four diagrams illustrate the reduction in the number of memory operations required shown in table 2.

Figure 3:
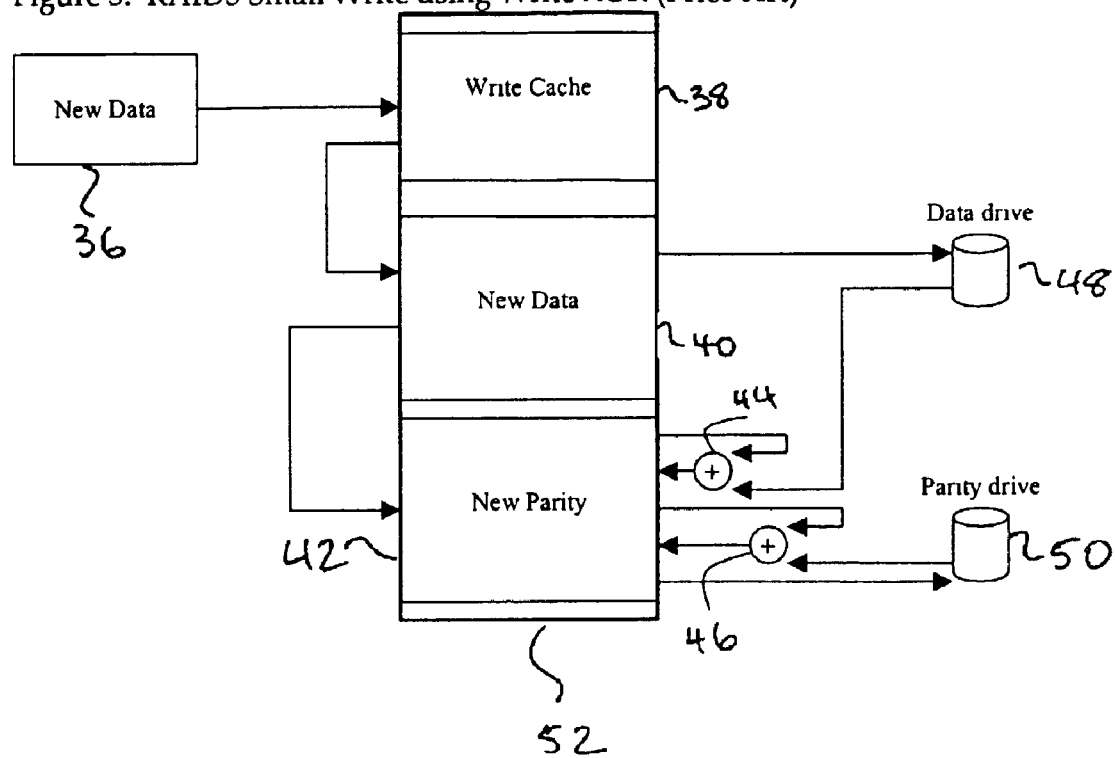
FIG. 3 is a block diagram of a prior art RAID 5 small write using "Write XOR" with write cache.

Referring now to FIG. 3, the current methodology for a RAID5 1 drive small write using "Write XOR" with Write Cache is shown. Beginning in step 1, new data 36 is transferred to the portion of memory designated as write cache 38 from host memory using DMA ("Direct Memory Access" is a method of transferring data between a device and memory without CPU involvement). In step 2, new data is then transferred to a new data region 40 from write cache 38 using DMA. In step 3, new data is then transferred to the new parity region 42 from the new data region 40 using DMA. In step 4, new parity is generated as an XOR of new data, old data, and old parity using "write XORs" of the old data and old parity, which may occur in any order. Old data is XOR'd 44 with contents of the new parity region 42 using the Write XOR alias address range. Old parity is XOR'd 46 with contents of the new parity region 42 the Write XOR alias address range. Lastly, in step 5, new data and parity are then written to the drives 48 and 50, respectively. The above sequence totals 11 memory operations.

The large, bold rectangle 52 represents the array controller's memory subsystem and its contents. The arrows all represent data movement in and out of memory. New data is sent from the host's memory. The "Write cache" area 38 is where all write data is first stored when sent to the array controller memory. The other regions such as new data and new parity are considered as temporary-use portions of memory.

The "Data drive" 48 is the drive that will get new data. It contains old data that should be "backed-out" of the "old parity". The parity drive 50 initially contains the "old parity" and will be updated with new parity. Note that FIG. 3 does not show the other data drives that may be part of the disk array.

Figure 4:
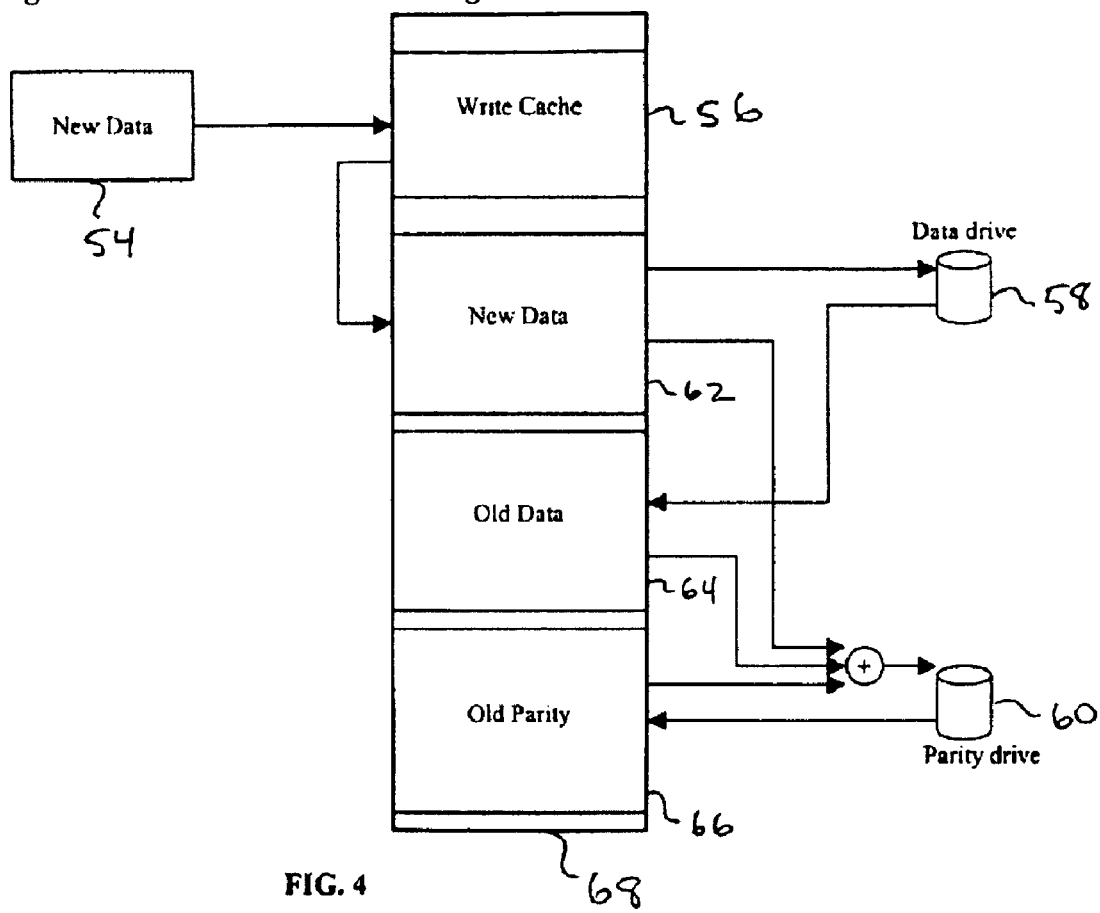
FIG. 4 is a block diagram of a RAID 5 update using "Read XOR" with write cache according to the present invention.

Referring now to FIG. 4, a new methodology according to the present invention for performing a RAID5 update using an XOR On Read with write cache is shown. In step 1, new data 54 is transferred to write cache 56 from host memory using DMA. In step 2, new data, old data, and old parity are written to memory (in any order). New data is written from write cache 56 to memory region 62. Old data 64 is written from data drive 58. Old parity 66 is written from parity drive 60. Lastly, in step 3, new data and new parity is written to drives 58 and 60. Drive 58 reads new data from memory region 62. Drive 60 reads new parity from memory using the "Read XOR" mechanism from memory segments 62, 64, and 66. The Read XOR mechanism is invoked by using an XOR alias address range with all three 8-bit DATUM multipliers specified as 1. In the preferred implementation, the new data, old data and old parity regions are equally sized and contiguous. The above sequence is accomplished using a total of nine memory operations.

As previously discussed, the "Read XOR" method of the present inventions differs from the "Write XOR" prior art technique in that fewer number of discrete steps are required and fewer memory operations are required. More total memory, however, is required to realized the benefit of reducing memory bandwidth. Note that the "Read XOR" mechanism is active on the last step in the sequence discussed above, where one read request from the parity drive 60 generates three read operations on the memory subsystem 68.

Figure 5:
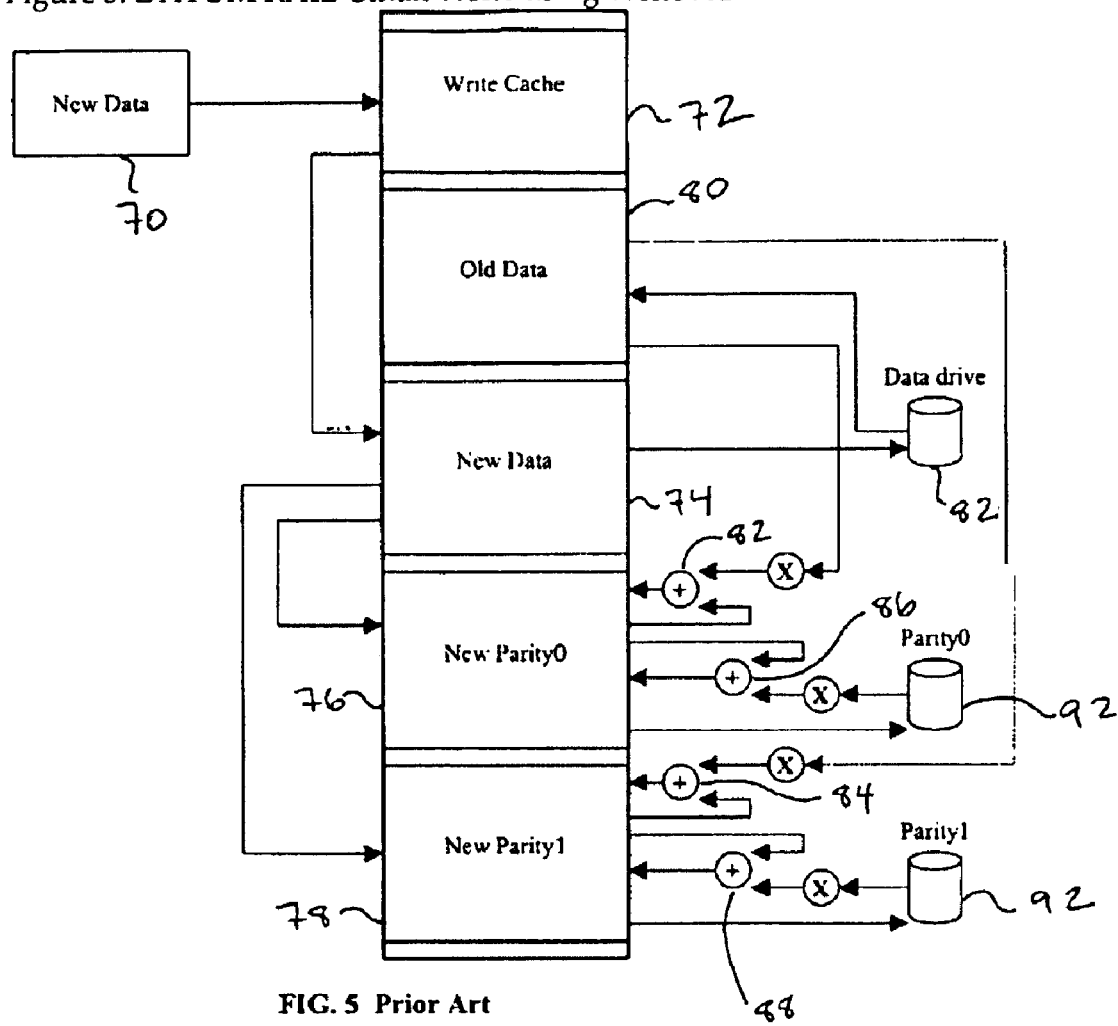
FIG. 5 is a block diagram of a prior art DATUM drive small write using "Write XOR" with write cache.

Referring now to FIG. 5, the current methodology for performing a DATUM RAID small write using "Write XOR" with write cache is shown. In step 1, new data 70 is transferred to the write cache region 72 from a host using DMA. In step 2, new data is transferred to the new data region 74 from write cache using DMA and then from the new data region 74 to each parity 76 and 78. Additionally, old data is transferred to the old parity region 80 from data drive 82. In step 3, new parity is generated as an XOR of new data, old data, and old parity. The XOR writes of old data and old parity may occur in any order. Old data is DATUM multiplied (with the appropriate multiplier specified in the XOR alias address range) and XOR'd 82 with the contents of Parity0 region 76 using DMA. Old data is DATUM multiplied and XOR'd 84 with the contents of Parity1 region 78 using DMA. Old Parity0 is DATUM multiplied and XOR'd 86 with the contents of Parity0 region 76 using the XOR address range. Old Parity1 is DATUM multiplied and XOR'd 88 with the contents of Parity1 region 78 using the XOR address range. Finally, new data and parity is written to the data drive 82, and parity drives 90 and 92. The above sequence requires 21 total memory operations.

The main difference between RAID5 and DATUM RAID is the addition of one (or more) parity (redundancy) drive and the use of DATUM multipliers during XOR operations.

Referring now to FIG. 6, a new methodology according to the present invention for performing DATUM RAID small write using "Read XOR" with write cache is shown. In step 1, new data 94 is transferred to write cache region 96 from host memory using DMA. In step 2, new data, old data, and old parity0/1 are written to memory (in any order).

New data is written into memory region 98 from write cache 96 using DMA. Old data is written into memory region 100 from data drive 102. Old Parity0 data is written into memory region 104 from Parity0 drive 106. Old Parity1 data is written into memory region 108 from Parity1 drive 110. In step 3, new data and new parity is written to drives 102, 106, and 110 in any order. Data drive 102 reads new data from memory region 98. Parity0 drive 106 reads new parity0 from memory segments 98, 100, and 104 using XOR on Read mechanism with datum multiply 112. Parity1 drive 110 reads new parity1 from memory segments 98, 100, and 108 using XOR on Read mechanism with datum multiply 114. The above sequences requires 13 total memory operations.

In the above example, the Read XOR mechanism is invoked by using an XOR alias address range with all three 8-bit DATUM multipliers specified as appropriate. In the preferred implementation, the new data, old data and old parity 0/1 regions are equally sized and contiguous. In addition, the XOR alias address range also provides a decode mechanism to specify which parity buffer to include in the Read XOR operation (0 or 1). The XOR alias address range thus consists of three 8-bit DATUM multipliers and one bit for parity buffer selection in addition to the normal address bits used for memory addressing. For a 32-bit memory subsystem with a 64-bit decode, the XOR alias address range would thus specify a 49-bit address window. The number of bits for parity buffer selection may be increased as needed to support more than two parity buffers.

In summary, the "Read XOR" technique of the present invention reduces the number of memory operations required to generate new parity. The resulting benefits from reduced memory bandwidth requirements, as discussed, are: the ability to use slower memory technologies and cheaper designs; the ability to use narrower memory busses with higher speed technologies; and the realization of higher performance for memory bandwidth constrained systems. It should be noted that a negative side effect of the "Read XOR" technique is the increase in memory capacity required to calculate parity. However, that disadvantage is minimized by memory technology trending towards denser (larger capacity) memories.

FIG. 7 is a block diagram of an ASIC 700 (Application Specific Integrated Circuit) in which the Read XOR invention is implemented. The ASIC 700 has busses connecting to external memory 702, a PCI-X bus 712, and SCSI disk drives 716. Communication to the external memory is via a memory controller 704. Communication to the PCI-X bus is through a I/O Bus queue 710 that connects to an internal bus 706. Communication to the disk drives is through a SCSI disk controller interface 714 that also connects to the internal bus 706. Also connected to the internal bus 706 is a DMA Engine 708. The memory controller 704 receives read and write requests from the tightly coupled memory queue 800 which processes and queues requests from the internal bus 706. Note that there may also be other functional blocks also attached to the internal bus 706.

The Read XOR method of the present invention is invoked whenever a DMA Engine 708, entity on the PCI-X bus 712, or a disk drive 716 causes a read request to be presented to the memory queue 800 with an address that is designated as XOR memory space. The address presented to the XOR memory space also encodes up to three DATUM multipliers that will be used by the memory queue 800.

The ASIC 700 can be fabricated using CMOS standard cells, as is known in the art. Other types of cells and semiconductor processes can be used as desired for a specific application. Multiplier structures appropriate for implementing ASIC 700 are described in U.S. Pat. No. 6,370,616, which is hereby incorporated by reference.

FIG. 8 is a diagram of the Read XOR method of the present invention as implemented in the memory queue 800. When data is read from the external memory 702 by the memory controller 704, it arrives on bus 802 into the memory queue 800. The memory queue 800 is a construct for locating the Read XOR logic. In practice, it is tightly coupled with the memory controller and for all practical purposes, looks like the memory controller on the internal bus 706. The memory queue 800 does the XOR address decoding and initiates the three reads required for Read XOR as well as the DATUM multiplication and XOR functions.

For the Read XOR method of the present invention, up to three sets of data can be DATUM multiplied and XOR'd together. The size of each set of data that is processed at one time is dependent on the size of the buffer 812. When the first set of data arrives on bus 802, it is DATUM multiplied 806 by the first DATUM multiplier in 804. It then passes through bus 808 and is stored in buffer 812. When the second set of data arrives on bus 802, it is DATUM multiplied 806 by the second DATUM multiplier in 804. The multiplied result of the second set of data is then fed into the XOR logic 810. The XOR logic 810 is also simultaneously reading the first set of multiplied data from the buffer 812. The XOR result of the first and second sets of data is then stored back into the buffer 812. When the third set of data arrives on bus 802, it is DATUM multiplied 806 by the third DATUM multiplier in 804. The multiplied result of the third set of data is then fed into the XOR logic 810. The XOR logic 810 is also simultaneously reading the buffered XOR result of the first and second sets of multiplied data from the buffer 812. The XOR result of the first, second and third sets of data are stored into the buffer 812 and then sent out on the internal bus 706 to the read requester. This process repeats until all the requested data is delivered to the read requester.

Referring once again to FIG. 6, note that the Read XOR mechanism 112, 114 is used twice: once for regions 100, 98 and 104 and once for regions 100, 98 and 108. In the preferred embodiment, a specific memory organization is required to handle these two cases. First, each region should be of the same size and that size should ideally remain constant for all Read XOR accesses. Second, each region should be stored contiguously in memory. The Read XOR logic is given a starting source address from which it is able to calculate the starting source address for each subsequent region. For example, when the Read XOR logic is given the starting address for the Old Data region 100, it determines the starting address for the New Data region 98 by adding the pre-configured size of the region. Similarly, determining the starting address of the Old Parity0 region 104 requires adding the size twice to the starting address of Old Data region 100.

One additional requirement for the preferred embodiment of the present invention is that the source address should also have a provision for selecting the correct data sets from the regions. Since the regions old data 100 and new data 98 are always used in the DATUM parity updates, the only selection required is for Parity0 104 and Parity1 108. Thus, one additional bit in the source address is necessary to indicate to the Read XOR logic whether to include 104 or 108 in the Read XOR process. Additional selection bits may be required to support DATUM RAID configurations with more than two parity (redundancy) drives.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

We claim:

1. A method of performing a DATUM RAID operation with multiple DATUM multipliers, the method comprising:

reading a source address including multiple DATUM multipliers;

reading multiple sets of source data;

multiplying each set of source data by its respective DATUM multiplier; and

XORing the resulting data sets from each multiplying step with each other;

returning the XOR result as the data for a read request.

2. The method of claim 1, wherein the source data is in an XOR memory address space.

3. The method of claim 1, wherein the source data is in an input/output address space.

4. The method of claim 1, wherein the reading of multiple DATUM multipliers comprises:

reading multiple DATUM multiplier in response to detection of a memory command.

5. The method of claim 4, wherein the memory command is a command to read data from an XOR memory address space.

6. The method of claim 1, wherein multiplying each set of source data by its respective DATUM multiplier comprises:

cycling the source data through a plurality of multiplication stages corresponding to a number of bits of the DATUM multiplier.

7. A memory interface controller adapted for performing DATUM RAID operations with DATUM multipliers, the controller comprising:
   means for reading a source address including multiple DATUM multipliers;
   means for reading multiple sets source data;
   means for multiplying each set of source data by its respective DATUM multiplier; and
   means for XORing each multiplied data set together and returning the XOR result as data for a read request.

8. The controller of claim 7, wherein the source data is in an XOR memory address space.

9. The controller of claim 7, wherein the source data is in an input/output address space.

10. The controller of claim 7, wherein the means for multiplying comprises:
    means for cycling the source data through a plurality of multiplication stages corresponding to a number of bits of the DATUM multiplier.

11. A system adapted for performing DATUM RAID operations, system comprising:
    a memory; and
    a bus/memory interface device, comprising:
    an input/output address space,
    a memory controller coupled to the memory;
    a normal memory address space associated with the memory;
    an XOR memory address space associated with the memory;
    a direct memory access engine operable in the normal memory address space, the XOR memory address space and the input/output address space, the direct memory access engine operable to move data from the XOR memory address space; and
    a memory interface controller coupled between the direct memory access engine and the memory controller, the memory interface controller comprising:
    a means for reading a source address including DATUM multipliers;
    a means for selectively reading source data from the memory address space;
    a means for multiplying the source data by DATUM multipliers; and
    a means for XORing multiplied source data associated with the source address and returning the data to the input/output address space or direct memory access engine.

12. The system of claim 11, wherein the source data is in the XOR memory address space.

13. The system of claim 11, wherein the source data is in the input/output address space.

14. The system of claim 11, the means for reading a DATUM multiplier comprising:
    a means for reading a DATUM multiplier in response to the memory interface controller detecting a memory command.

15. The system of claim 14, wherein the memory command is a type of XOR command.

16. The system of claim 14, wherein the memory command is a command to move data from the XOR memory address space.

17. The system of claim 11, wherein the bus/memory interface device comprises:
    an XOR base address register to define the XOR memory address space.

18. The system of claim 11, the means for multiplying comprising:
    a means for cycling the source data through a plurality of multiplication stages corresponding to the number of bits of the DATUM multiplier.

19. A memory interface controller adapted to perform DATUM RAID operations with a DATUM multiplier, comprising:
    a read engine configured to read source data and a source address including DATUM multipliers;
    multiplication logic configured to multiply the source data by the DATUM multipliers; and
    an XOR engine configured to XOR resulting data produced by the multiplication logic and return the result to requestor.

20. The controller of claim 19, wherein the source data is in an XOR memory address space.

21. The controller of claim 19, wherein the source data is in an input/output address space.

22. A method for performing DATUM RAID operations comprising:
    reading multiple sets of source data;
    multiplying each data set with a DATUM multiplier;
    XORing the results of the multiplication together; and
    returning the XORed result as the data for a read request.

23. The method of claim 22 further comprising specifying a source address as part of the read request.

24. The method of claim 23, wherein the source address comprises multiple DATUM multipliers.

25. The method of claim 23, wherein the source address comprises a bit for data set selection.

26. The method of claim 23, wherein the source address comprises a starting memory address.

27. The method of claim 22, wherein the sets of source data are organized such that each set of data is a fixed size.

28. The method of claim 22, wherein the sets of source data are organized such that each set of data is stored contiguously in memory.

29. The method of claim 23, wherein the sets of source data are organized such that:
    the starting address of a first set of data is specified by the source address;
    the starting address of a second set of data is specified by the source address plus the size of one set of data;
    the starting address of a third set of data is specified by the source address plus the size of two sets of data; and
    the starting address of a fourth set of data is specified by the source address plus the size of three sets of data.

30. The method of claim 29 further comprising selecting the first, second, and third data sets for the purpose of supporting DATUM RAID configurations with more than one drive of redundancy information.

31. The method of claim 29 further comprising selecting the first, second, and fourth data sets for the purpose of supporting DATUM RAID configurations with more than one drive of redundancy information.

* * * * *

UNITED STATES PATENT AND TRADEMARK OFFICE
CERTIFICATE OF CORRECTION

PATENT NO.        : 6,918,007 B2                                      Page 1 of 1
APPLICATION NO.   : 10/237330
DATED             : July 12, 2005
INVENTOR(S)       : Albert H. Chang et al.

It is certified that error appears in the above-identified patent and that said Letters Patent is hereby corrected as shown below:

In column 3, line 28, delete "RAIDS" and insert -- RAID5 --, therefor.

In column 8, line 61, in Claim 4, delete "multiplier" and insert -- multipliers --, therefor.

In column 9, line 9, in Claim 7, after "sets" insert -- of --.

In column 10, line 21, in Claim 19, after "to" insert -- a --.

Signed and Sealed this

Twentieth Day of July, 2010

David J. Kappos
*Director of the United States Patent and Trademark Office*